(12) United States Patent
Yamaura et al.

(10) Patent No.: US 6,841,289 B2
(45) Date of Patent: Jan. 11, 2005

(54) ELECTROCHEMICAL DEVICE AND METHOD FOR PREPARATION THEREOF

(75) Inventors: Kiyoshi Yamaura, Kanagawa (JP); Minehisa Imazato, Tokyo (JP); Toru Kihira, Kanagawa (JP)

(73) Assignee: Sony Corporation, Tokyo (JP)

( * ) Notice: Subject to any disclaimer, the term of this patent is extended or adjusted under 35 U.S.C. 154(b) by 71 days.

(21) Appl. No.: 09/967,310

(22) Filed: Sep. 28, 2001

(65) Prior Publication Data

US 2002/0146615 A1 Oct. 10, 2002

(30) Foreign Application Priority Data

Sep. 29, 2000 (JP) ........................................ 2000-298902

(51) Int. Cl.[7] .......................... H01M 4/86; H01M 4/90; H01M 4/96; H01M 8/10
(52) U.S. Cl. .............................. 429/42; 429/30; 429/40
(58) Field of Search .............................. 429/30, 40, 42, 429/27

(56) References Cited

U.S. PATENT DOCUMENTS

| 5,470,680 A | | 11/1995 | Loutfy et al. | |
|---|---|---|---|---|
| 5,672,439 A | * | 9/1997 | Wilkinson et al. | ............. 429/40 |
| 5,728,485 A | * | 3/1998 | Watanabe et al. | ............. 429/41 |
| 2002/0006539 A1 | | 1/2002 | Kubota et al. | |

FOREIGN PATENT DOCUMENTS

| JP | 03074056 | 3/1991 |
|---|---|---|
| JP | 07134996 | 5/1995 |
| JP | 07326363 | 12/1995 |
| JP | 2000136493 | 5/2000 |

OTHER PUBLICATIONS

Edie et al., Effect of Microstructure and Shape on Carbon Fiber Properties, pp. 41–45, 1993, Noyes Publications, New Jersey.*

* cited by examiner

*Primary Examiner*—Patrick Ryan
*Assistant Examiner*—Julian Mercado
(74) *Attorney, Agent, or Firm*—Bell, Boyd & Lloyd LLC

(57) ABSTRACT

An electrochemical device and a method for the preparation thereof, the electrochemical device having a high catalyst utilization efficiency including a gas diffusion electrode formed of a carbonaceous material and having a catalyst formed on at least a portion of its surface, and a proton conducting film provided in contact with one surface of the gas diffusion electrode, wherein the amount of the catalyst formed on the surface of the carbonaceous material contacting the proton conducting film is lesser in amount than on the surface of the carbonaceous material that is not contacting the proton conducting film, thereby appreciably increasing catalyst utilization efficiency and rendering it possible to elevate the energy efficiency of the electrochemical device.

7 Claims, 3 Drawing Sheets

ELECTROCHEMICAL DEVICE AND METHOD FOR PREPARATION THEREOF

RELATED APPLICATION DATA

The present invention claims priority to Japanese Patent Document No. P2000-298902 filed on Sep. 29, 2000. The above referenced Japanese Patent Document is incorporated by reference to the extent permitted by law.

BACKGROUND OF THE INVENTION

The present invention relates to an electrochemical device and a method for the preparation thereof.

Since the time of Industrial Revolution in the nineteenth century, fossil fuels, such as gasoline, kerosene, coal, or the like, have been used not only as an energy source for vehicles, but also as an energy source for power generation. Fossil fuels have allowed the human race to enjoy many benefits such as a higher standard of living, advances in industrial development, and the like. However, continued use of fossil fuels risks severe environmental destruction. Furthermore, there exists fear and uncertainty over the possibility of the depletion of fossil fuel sources, so much so that the stable supply of fossil fuels over the long term is in question.

Hydrogen is contained in water and exists abundantly on the earth, and since it has a large chemical energy contained per unit weight and, in use as an energy source, does not emit noxious gases or gases possibly contributing to global warming, it is desirable as an energy source, one which is clean and moreover plentiful in supply.

Research advances relating to a fuel cell, capable of recovering electrical energy from hydrogen continue to be developed. In this regard, expectations are high for the application of fuel cells to large scale power generation, on-site self-generation of power, a power source for an electric vehicle, or the like.

Typically, an electrical energy generating device for gathering electrical energy from hydrogen (i.e., a fuel cell) can include a hydrogen electrode, fed with hydrogen, and an oxygen electrode, fed with oxygen. Hydrogen fed to the hydrogen electrode is dissociated into a proton and electrons, by a catalytic action, with the electrons being collected by a current collector of the hydrogen electrode. The proton is transported towards the oxygen electrode. The electrons fed to the hydrogen electrode are transported through a load to the oxygen electrode. Meanwhile, oxygen fed to the oxygen electrode is bound to the proton and to the electrons, transported from the hydrogen electrode, to generate water. Thus, an electromotive force is produced between the hydrogen and oxygen electrodes thereby causing current to flow in the load.

In order to produce an electromotive force across the hydrogen and oxygen electrodes, hydrogen needs to be dissociated into the proton and electrons on the hydrogen electrode, while the proton, electrons and oxygen must react on the oxygen electrode to yield water. Thus, a catalytic layer for promoting dissociation of the proton and the electrons of hydrogen is needed in the hydrogen electrode, while a catalytic layer for promoting the linkage of the proton, electrons and oxygen is needed in the oxygen electrode.

The catalytic layers bring about the aforementioned action by contacting with hydrogen in the hydrogen electrode, and by contacting with oxygen in the oxygen electrode. Thus, in order for the catalytic layers to operate effectively, the catalyst contained in the catalytic layer needs to contact efficiently with hydrogen or oxygen. Thus, if the contact efficiency between the catalyst contained in the catalytic layer and the hydrogen or oxygen is low, the catalytic action achieved is insufficient in comparison with the amount of the catalyst used.

The aforementioned problem concerning energy inefficiency occurs not only in the hydrogen or oxygen electrodes of a typical fuel cell, but also in a gas diffusion electrode used in other typical electrochemical devices, such as an air cell, or the like.

SUMMARY OF THE INVENTION

An advantage of the present invention is, therefore, to provide an electrochemical device in which the catalyst and the feed gas may contact effectively with each other in order to elevate or enhance energy efficiency.

In an embodiment, the present invention provides an electrochemical device having a high catalyst utilization efficiency including a gas diffusion electrode formed of a carbonaceous (i.e. formed primarily of carbon) material and having a catalyst formed on at least a portion of the surface thereof defining a first surface region and a second surface region, and a proton conduction unit (i.e., an electrode film, an electrolyte film, or other suitable materials and structures thereof) provided in contact with the first surface region. Preferably, the amount of the catalyst formed on the first surface region is lesser than the amount of the catalytic layer formed on the second surface region. Thus, the catalyst utilization efficiency is increased appreciably, thereby rendering it possible to elevate the energy efficiency of the electrochemical device.

According to an embodiment of the present invention, the amount of the catalyst deposited on the surface area of the carbonaceous material facing the proton conduction unit is smaller than the amount catalyst on the surface area of the carbonaceous material facing a flow channel for the feed gas. Thus, the amount of the catalyst contacting the proton conduction unit is effectively minimized, thereby enabling the total amount of the catalyst that is applied to the carbonaceous material to react more effectively with the gas diffusion electrode. Accordingly, an electrochemical device with improved energy efficiency is provided.

In an embodiment of the present invention, the electrochemical device is a fuel cell.

In an embodiment of the present invention, the electrochemical device is an air cell.

In an embodiment of the present invention, the carbonaceous material includes a number of aggregates of fiber-like carbon (i.e., a fibrous material composed of carbon).

In an embodiment of the present invention, the fiber-like carbon contains at least needle-like graphite (i.e., a graphite material having a fibrous structure composed of, for example, finely-sized fibers).

In an embodiment of the present invention, the fiber-like carbon contains at least carbon nano-tubes (i.e. a carbon material having a tubular structure, or other suitable structure).

In an embodiment of the present invention, the catalyst includes a material such as, platinum, platinum alloys, palladium, magnesium, titanium, manganese, lanthanum, vanadium, zirconium, nickel-lanthanum alloys, titanium-iron alloys, iridium, rhodium, gold, the like and combinations thereof.

In another embodiment, the present invention provides a method for the preparation of an electrochemical device. Preferably, the method includes the steps of providing a sheet, or other suitable structure of a carbonaceous material, forming a catalytic layer upon a first portion of the sheet of carbonaceous material, and applying a proton conduction unit on a second portion of the surface sheet of carbonaceous material.

According to an embodiment of the present invention, a carbonaceous material is provided in the form of a sheet, layer, thickness, film, the like or other suitable structure and a catalytic layer is formed, using a gas phase film-forming method, upon a portion of the carbonaceous material, while a proton conduction unit is bonded to a portion of the carbonaceous material. The portion of the sheet of carbonaceous material contacting the proton conduction unit is lesser in the amount of the catalyst deposited thereon than the portion not contacting the proton conduction unit, such that the section of the catalytic layer actually contacting the proton conduction unit is effectively minimized, thereby enabling the total amount of the catalyst and the feed gas to contact more effectively with each other in order to produce an electrochemical device improved in energy efficiency.

In an embodiment of the present invention, the carbonaceous material is fiber like carbon.

In an embodiment of the present invention, the carbonaceous material contains at least needle-like graphite.

In an embodiment of the present invention, the carbonaceous material contains at least carbon nano-tubes.

In an embodiment of the present invention, the step of providing the sheet of carbonaceous material includes the step of introducing the fiber-like carbon into a liquid suspension for filtration thereof to form the sheet of carbonaceous material.

In an embodiment of the present invention, the gas phase film-forming method is a sputtering method.

In an embodiment of the present invention, the gas phase film-forming method is a vacuum vapor deposition method.

In an embodiment of the present invention, the gas phase film-forming method is a pulse laser deposition method.

In an embodiment of the present invention, a sheet of a carbon-based material is applied to the sheet of carbonaceous material.

In an embodiment, the carbon-based material can be different than, substantially similar to, or identical to the sheet of carbonaceous material In an embodiment of the present invention, it is possible to improve the mechanical strength of the carbonaceous material in a sheet or other suitable form.

According to the present invention, in which the gas diffusion electrode is formed by a number of aggregates of fiber-like carbon, and the portion of the fiber-like carbon covered by the proton conduction unit is covered with the catalyst in a lesser amount than the exposed portion of the fiber-like carbon, the catalyst utilization efficiency may be improved appreciably to improve the energy efficiency of the electrochemical device.

In another embodiment, an electrochemical device can include a gas diffusion electrode having a carbonaceous material that has a catalytic layer formed on at least a portion thereof and a proton conduction unit contacting the gas diffusion electrode such that at least a portion of the carbonaceous material is embedded within the proton conduction unit, wherein the amount of the catalytic layer is lesser in the embedded portion than in a portion of the carbonaceous material that is not embedded within the proton conduction unit.

Additional features and advantages of the present invention are described in, and will be apparent from, the following Detailed Description of the Invention and the Figures.

DETAILED DESCRIPTION OF THE INVENTION

Figure 1:
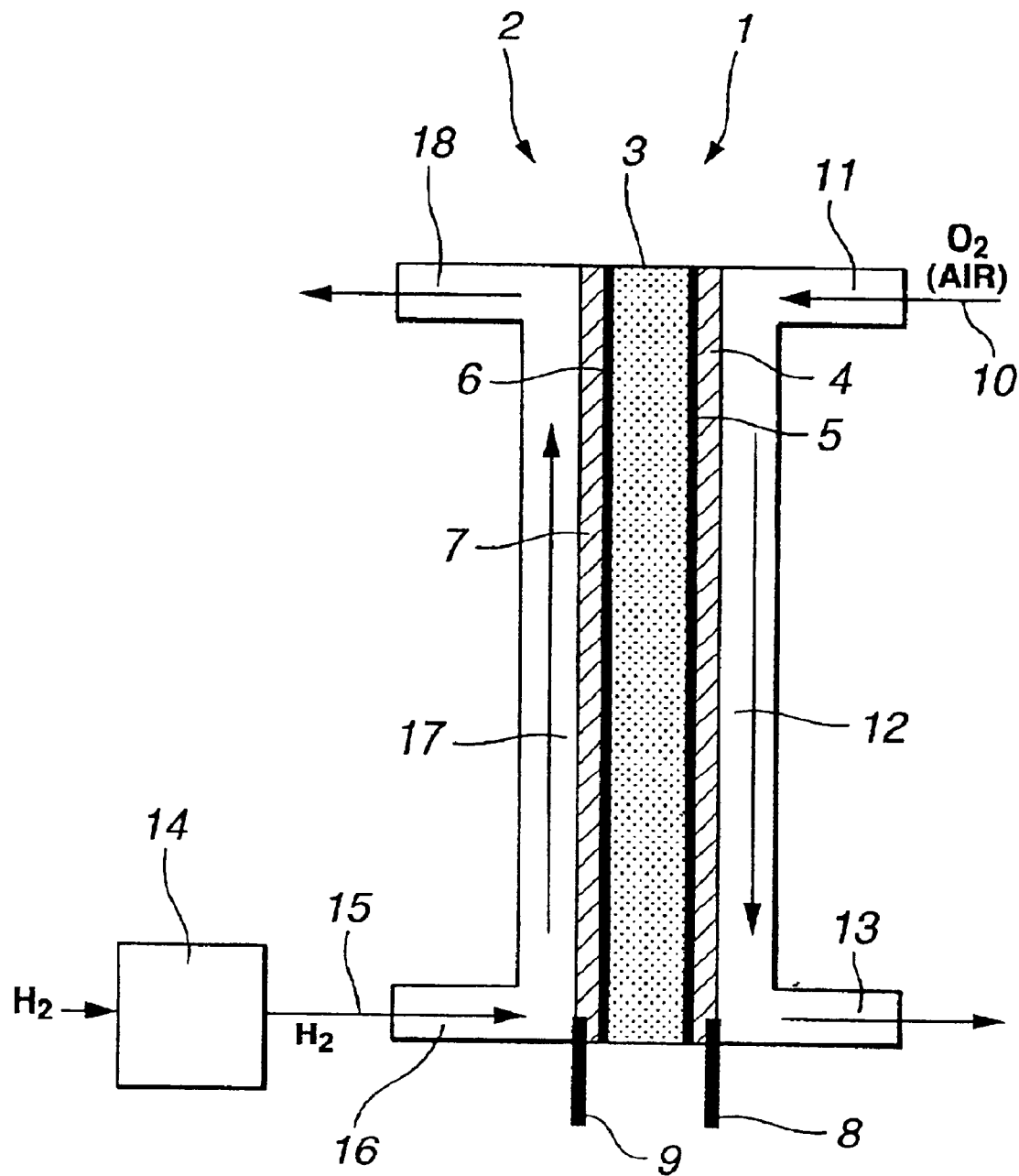
FIG. 1 shows a schematic illustration of a structure of a fuel cell in accordance with an embodiment of the present invention.

FIG. 1 shows a schematic illustration of a structure of a fuel cell in accordance with an embodiment of the present invention. In general, the fuel cell includes an oxygen electrode 1, a hydrogen electrode 2 serving as a fuel electrode, and a proton conduction unit 3 composed of an electrolyte film, electrode film, or other suitable material or structure thereof, the proton conduction unit being sandwiched between the oxygen electrode 1 and the hydrogen electrode 2. Preferably, the oxygen electrode 1 is formed by an electrode substrate 4, formed of a fiber-like carbon aggregate, and a catalytic layer 5 formed on its surface. Preferably, the hydrogen electrode 2 is formed by an electrode substrate 7, formed of a fiber-like carbon aggregate, and a catalytic layer 6 formed on its surface. In an embodiment, the catalytic layers 5, 6 may be formed of a material such as, platinum, platinum alloys, palladium, magnesium, titanium, manganese, lanthanum, vanadium, zirconium, nickel-lanthanum alloys, titanium-iron alloys, iridium, rhodium, gold, the like and combinations thereof. Of the aforementioned materials, platinum and platinum alloys are preferred.

In an embodiment, a cathode lead 8 is derived from the electrode substrate 4 of the oxygen electrode 1, while an anode lead 9 is derived from the electrode substrate 7 of the hydrogen electrode 2. The cathode lead 8 and the anode lead 9 are connected to a load (not shown). On the oxygen electrode 1, air 10 is supplied from an inlet 11 to a flow channel 12 so as to be discharged at an exit port 13, whereas, on the hydrogen electrode 2, hydrogen 15 supplied from a hydrogen supply source 14 is supplied via an inlet 16 to a flow channel 17 so as to be discharged at an exit port 18.

In an embodiment, hydrogen 15 supplied from the inlet 16 to the flow channel 17 flows through the electrode substrate 7 to reach the catalytic layer 6 and is dissociated by the catalytic action into a proton and electrons. The electrons migrate through the electrode substrate 7 towards the anode lead 9 so as to be supplied to the load (not shown), while the proton migrates through the proton conduction unit 3 towards the oxygen electrode 1. On the opposite side, oxygen 10 fed via inlet 11 to the flow channel 12 flows through the electrode substrate 4 to reach the catalytic layer 5 and is bound, by the catalytic action, with the proton supplied from the proton conduction unit 3 and with the electrons supplied from the load (not shown) via cathode lead 8, to yield water. Thus, the fuel cell is able to produce the desirable electromotive force.

In an embodiment, the proton conduction unit 3 is composed of a film or other suitable material or structure that prevents permeation of hydrogen 15 and allows for transmission of the proton therethrough. Preferably, the material of the proton conduction unit 3, is based on a carbonaceous material that forms a matrix structure, into which proton dissociating groups are introduced. "Proton dissociating groups" are functional groups from which a proton may be dissociated by electrical dissociation.

In an embodiment, the carbonaceous material of the proton conduction unit 3, can include any suitable material primarily composed of carbon. However, it is necessary that, following introduction of the proton dissociating groups, the ion conductivity be higher than the electronic conductivity. The carbonaceous material that forms the matrix structure of the proton conduction unit can include, for example, carbon clusters, an aggregate of carbon atoms, a carbonaceous material containing carbon nano-tubes, other suitable materials or combinations thereof.

In an embodiment according to the present invention fullerenes, carbon clusters having fullerene structures exhibiting open ends on at least a portion thereof, or carbon clusters exhibiting diamond structures, are desirable. Of course, any suitable material exhibiting ionic conductivity higher than electronic conductivity following introduction of the proton dissociating groups may be used.

In an embodiment, as the carbonaceous material forming the matrix structure of the proton conduction unit 3, fullerene is preferred. Preferably, a material derived from fullerene, into which are introduced proton dissociating groups, such as —OH, $OSO_3H$, —COOH, —$SO_3H$, —OPO$(OH)_2$ groups, the like and combinations thereof are used as the material for the proton conduction unit 3.

In an embodiment, a material different from the carbonaceous material as previously discussed, for example, perfluorosulfonic acid resin or the like may be used as the material of the proton conduction unit 3.

In an embodiment, the hydrogen supply source 14 may be a hydrogen tank, a hydrogen occlusive alloy, a carbonaceous hydrogen-occlusive material, or the like. The carbonaceous hydrogen-occlusive material can include, for example, fullerene, carbon nano-fibers, carbon nano-tubes, carbon soot, nano-capsules, buckyonions, carbon fibers, the like and combinations thereof.

Figure 2:
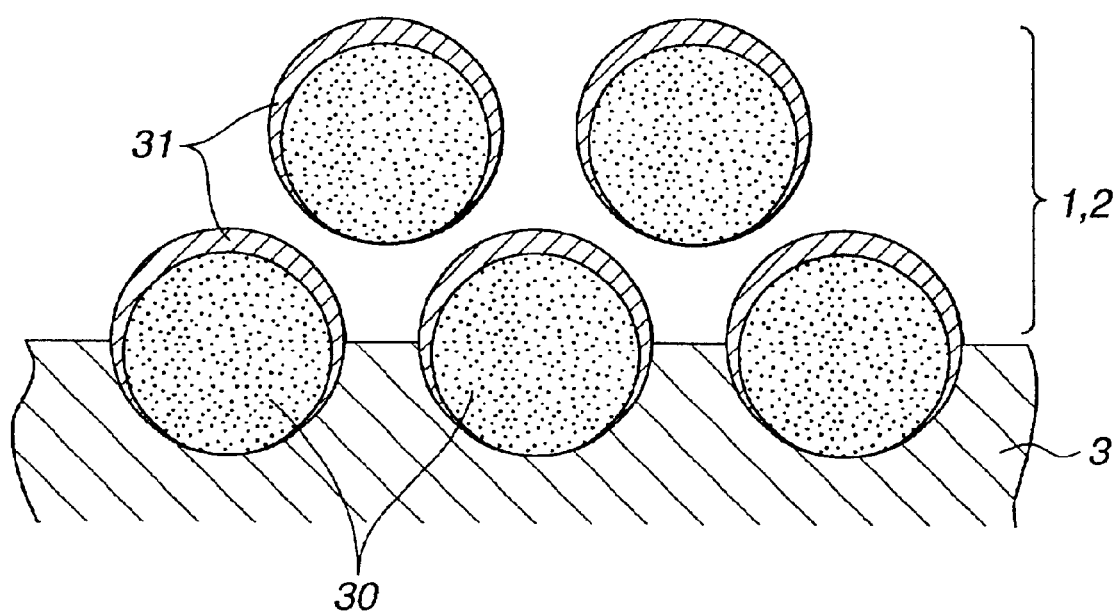
FIG. 2 shows a schematic cross-sectional illustration of an interface between a proton conduction unit and at least one of an oxygen electrode and a hydrogen electrode in accordance with an embodiment of the present invention.

FIG. 2 shows a schematic cross-sectional illustration of an interface between the proton conduction unit 3 and the oxygen electrode 1 or the hydrogen electrode 2. In an embodiment, the electrode substrates 4, 7 forming the oxygen electrode 1 and the hydrogen electrode 2, respectively, are made up of a number of fiber-like carbons 30, carrying a catalyst 31 on its surface. The fiber-like carbons 30 contacting the proton conduction unit 3 are partially embedded within the material of the proton conduction unit 3. In the so embedded portions, the amount of the catalyst is lesser than that in the non-embedded portion. Preferably, the catalyst 31 is not formed in the embedded portions, although it is difficult, in practice, to eliminate the catalyst 31 completely from the embedded portions. Therefore, it is sufficient if the amount of the catalyst 31 be effectively minimized in the embedded portion.

In an embodiment, the oxygen electrode 1 or the hydrogen electrode 2 is formed by a plural number of aggregates of fiber-like carbon 30, with the catalyst 31 being formed on their surfaces. Since the amount of the catalyst 31 formed is smaller in the portions of the fiber-like carbon 30 covered by the material of the proton conduction unit 3 than in the non-embedded portions, the catalyst utilization efficiency is high. Thus, the portions of the fiber-like carbon 30 not covered by the proton conduction unit 3 are not contacted with oxygen 10 nor with hydrogen 15, such that if the catalyst 31 is formed on these portions, the role of the catalyst is not performed. Therefore, in an embodiment according to the present invention, the amount of the catalyst 31 formed in the embedded portion is effectively minimized, thereby increasing the utilization efficiency of the catalyst 31 and improving the energy generating efficiency of the fuel cell.

In an embodiment, a method is provided for preparing the oxygen electrode 1 and the hydrogen electrode 2, a filter having a preset surface area and a liquid suspension containing fiber-like carbon. The fiber-like carbon may be enumerated by carbon nano-tubes, needle-like graphite, the like and combinations thereof. If carbon nano-tubes are selected as the fiber-like carbon, there is raised a difficulty in that, even though the carbon nano-tubes are extremely fine fiber-like material and hence are liable to be entangled together, gas permeability is lowered due to high density of the carbon nano-tubes. If the needle-like graphite, which is in the form of fibers thicker than the carbon nano-tubes, is selected as the fiber-like carbon, there is raised a difficulty in that the fibers are less liable to be entangled together, even though the gas permeability is sufficient. Therefore, in an embodiment, it is desirable that the fiber-like carbon to be mixed into the liquid suspension be a mixture at a preset ratio of the carbon nano-tubes and the needle-like graphite, the like and combinations thereof.

In an embodiment, the carbon nano-tubes are a tubular carbonaceous material having a diameter less than approximately a few nm, typically about 1.2 to about 1.7 nm, and may be of two known types, that is single-walled carbon nano-tubes, made up of a single-layer tube (SWCNT), and multi-walled carbon nano-tubes (MWCNT) having two or more concentric layers. There is no particular limitation to the length of the carbon nano-tubes, which may typically be about a few $\mu$m. The carbon nano-fibers are carbon nano-tubes having a particularly large diameter, with the diameter being typically about a few nm, with the giant carbon nano-fibers being of a diameter reaching about 1 $\mu$m. In an embodiment, "carbon nano-tubes" include carbon nano-fibers.

In an embodiment, the carbon nano-tubes may be generated by an arc discharge method employing a graphite rod.

In an embodiment the filter filters out the liquid suspension and collects the carbon nano-tubes, needle-like graphite, the like and combinations thereof. Preferably, a filter formed by glass fibers or the like is employed. In an embodiment, the liquid suspension is mixture containing water, alcohols, such as methanol or ethanol, toluene, and a trace mount of sodium hydroxide added thereto. Sodium hydroxide prevents flocculation of the carbon nano-tubes and the needle-like graphite.

In an embodiment the liquid suspension is filtered using the filter thereby depositing a mixture of the carbon nano-tubes and the needle-like graphite on the film surface. Since the carbon nano-tubes and the needle-like graphite are both of the fiber-like quality, the numerous carbon nano-tubes and the needle-like graphite become entangled together and unified on the fiber surface to form a sheet of carbonaceous material. In order to form the catalyst 31 effectively, the sheet of carbonaceous material is desirably as thin in thickness as possible insofar as the mechanical strength of the sheet itself is thereby not lowered. The aggregate of the sheet carbon nano-tubes and the needle-like graphite formed on the filter surface is peeled from the filter surface and introduced into a sputtering chamber.

In the sputtering chamber, the catalyst 31 is formed by the sputtering method on the aggregate of the sheet-like carbon nano-tubes. The catalyst may be formed of a material exemplified by platinum, platinum alloys, palladium, magnesium, titanium, manganese, lanthanum, vanadium, zirconium, nickel-lanthanum alloys, titanium-iron alloys, iridium, rhodium, gold, the like and combinations thereof. Of the aforementioned materials, platinum and platinum alloys are preferred.

Using the sputtering method, the catalyst 31 is formed only on the portion of the aggregate of the sheet of carbon nano-tubes exposed to the target. Thus, the portion of the aggregate of the sheet of carbon nano-tubes lying in the "shade" of sputtering is not coated with the catalyst 31. The surface of the sheet facing the target in sputtering and the sheet surface opposite thereto are termed a "front surface" and a "rear surface" of the sheet, respectively.

The rear surface of the sheet is then coated with the same proton conducting material as that used in the proton conduction unit 3. For example, if a material obtained on introducing a proton dissociating group —OH into fullerene (fullerenol) is used as the material of the proton conduction unit 3, fullerenol is also used to coat the sheet. Thus, the oxygen electrode and the hydrogen electrode 2 are formed.

The proton conduction unit 3 is sandwiched by the rear surfaces of the oxygen electrode 1 and the hydrogen electrode 2, and an inlet 11, a flow channel 12 and an outlet 13 for air 10 are formed on same side as the oxygen electrode 1, while an inlet 16, a flow channel 17 and an outlet 18 for hydrogen 15 are formed on the same side as the hydrogen electrode 2. Thus, a fuel cell in an embodiment according to the present invention is formed.

In an embodiment, the catalyst 31 is sputtered on the sheet surface, yet the catalyst 31 is substantially not deposited on the rear surface of the sheet. Thus, if the oxygen electrode 1 and the hydrogen electrode 2 are each formed by this sheet and the proton conduction unit 3 is sandwiched by the rear surfaces of these sheets to form the fuel cell, it is possible to reduce the amount of the catalyst 31 in the portion of the aggregate of fiber-like carbon 30 forming the oxygen electrode 1 and the hydrogen electrode 2 that is covered by the proton conduction unit 3, thereby raising the utilization efficiency of the catalyst 31 and hence the energy producing efficiency of the fuel cell related to the amount of the catalyst 31 used.

Figure 3:
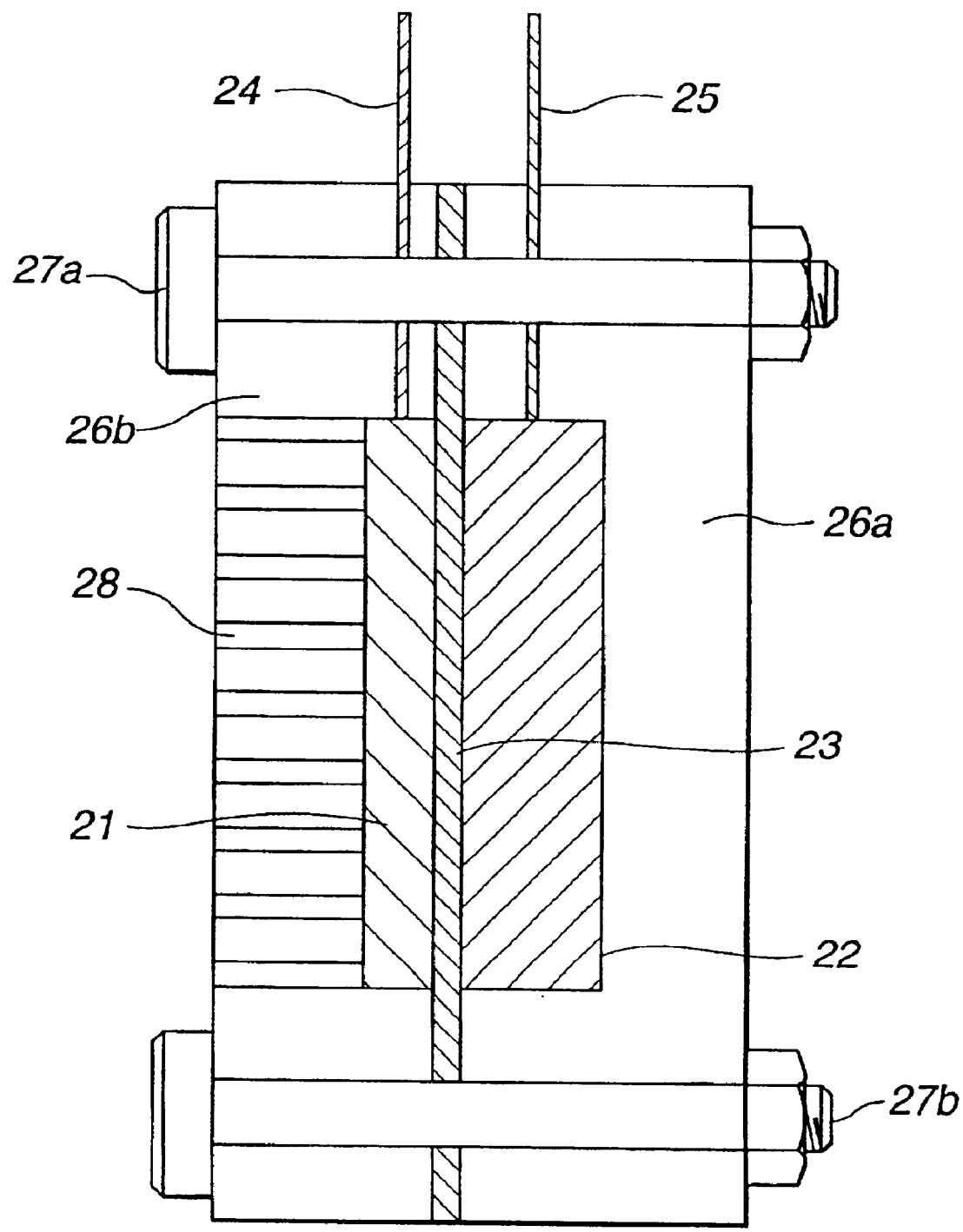
FIG. 3 shows a schematic illustration a structure of an air cell in accordance with an embodiment of the present invention.

FIG. 3 shows a schematic illustration a structure of an air cell in accordance with an embodiment of the present invention. In general, the air cell includes an air electrode 21, an anode 22 and an electrolyte 23 sandwiched between the air electrode 21 and the anode 22. The air electrode 21 is formed by an electrode substrate, formed by an aggregates of fiber-like carbon and a catalytic layer formed on its surface. The anode 22 is formed by a zinc sheet approximately 100 $\mu$m in thickness. A cathode lead 24 is derived from the electrode substrate of the air electrode 21, while an anode lead 25 is derived from the anode 22, both leads 24, 25 being connected to a load (not shown). The air electrode 21, anode 22 and the electrolyte 23 are sandwiched by Teflon®, or the like, sheets 26a, 26b, about 3 mm in thickness, with the Teflon sheets 26a, 26b being secured together with bolts 27a, 27b. A number of air openings 28 are formed in the Teflon sheet 26b for supplying air to the air electrode 21. The air openings 28 are about 1.5 mm in diameter.

In an embodiment, the air cell is prepared by forming a catalytic layer, in accordance with the aforementioned methods, on the surface of the aggregates of fiber-like carbon to form the air electrode 21. The reverse surface of the air electrode 21 is coated with a gelated aqueous solution of zinc chloride, as an electrolyte 23, to a thickness of approximately 50 $\mu$m, and the anode 22 is bonded in position. Using the Teflon sheets 26a, 26b, both sides of the resulting unit are tightly clamped together and made fast with the bolts 27a, 27b. Thus, an air cell in accordance with an embodiment of the present invention is formed.

In an embodiment, in the air cell, a reaction proceeds in the air electrode 21 and in the anode 22 and are indicated, respectively, by the formula (1) and by the formula (2):

$$O_2 + 2H_2O + 4e^- \rightarrow 4OH^- \tag{1}$$

$$Zn + 2OH^- \rightarrow Zn(OH)_2 + 2e^- \tag{2}$$

Thus, the reaction indicated by the formula (3) on the whole to produce the targeted electromotive force:

$$\tfrac{1}{2}O_2 + Zn + H_2O \rightarrow Zn(OH)_2 \tag{3}$$

In the air cell of an embodiment, the amount of the catalyst formed is smaller in the portion of the fiber-like carbon covered by the electrolyte 23 than in the portion thereof not covered in this manner, thereby improving the catalyst utilization efficiency significantly. The result is that the air cell of the present invention can be improved in energy efficiency.

The present invention is not to be limited to the embodiments described herein and may be suitably modified without departing from its scope. For example, as described above, the sputtering method is used as a method for forming the catalyst on the surface of the sheet-like aggregate of fiber-like carbon. However, in an embodiment, the method of forming the catalyst on the surface of the sheet-like aggregate of fiber-like carbon is not limited to the sputtering method. Thus, other methods, such as other gas phase film-forming methods, for example, a vacuum vapor deposition method, a pulse laser deposition method, the like and combinations thereof may also be used.

As described above, the sheet of the aggregates of fiber-like carbon, carrying the catalyst, is directly used as the oxygen electrode 1 and the hydrogen electrode 2. In an embodiment, a carbon sheet may be bonded to the sheet surface to form the oxygen electrode 1 or the hydrogen electrode 2. Since the sheet of the aggregates of fiber-like carbon 30 is desirably as thin in thickness as possible, as described above, it may be feared that the physical strength of the sheet falls short. If a carbon sheet is bonded on the sheet surface, it may be possible to increase its strength. If the catalyst 31 is formed on the surface of the sheet of the aggregate of fiber-like carbon 30 by sputtering and filtration is then carried out using a liquid suspension containing the fiber-like carbon 30, the aggregates of fiber-like carbon 30 may be further deposited on the sheet surface to form the oxygen electrode 1 and the hydrogen electrode 2.

Moreover, as described above, the hydrogen gas is used as the fuel gas of the fuel cell. However, as the fuel gas, gases obtained on vaporizing methanol, for example, may be used in place of the hydrogen gas. For example, the reaction indicated by the formula (4):

$$CH_3OH + H_2O \rightarrow CO_2 + 6H^+ + 6e^- \tag{4}$$

and the reaction indicated by the formula (5):

$$6H^+ + \tfrac{3}{2}O_2 + 6e^- \rightarrow 3H_2O \tag{5}$$

proceed in the anode fed with the gas obtained on vaporizing methanol and in the oxygen electrode 1 (cathode) fed with air, respectively, so that, on the whole, the reaction indicated by the formula (6):

$$CH_3OH + \tfrac{3}{2}O_2 \rightarrow CO_2 + 2H_2O \qquad (6)$$

proceeds to produce the targeted electromotive force.

It should be noted that, upon vaporizing methanol as the fuel gas, carbon dioxide is yielded, in addition to water.

Although the present invention has been described with reference to specific embodiments, those of skill in the art will recognize that changes may be made thereto without departing from the spirit and scope of the invention as set forth in the hereafter appended claims.

What is claimed is:

1. An electrochemical device, comprising:
a gas diffusion electrode comprising a fibrous carbonaceous material and a catalytic layer formed on at least a portion of a surface of the fibrous carbonaceous material including a first surface region and a second surface region, wherein at least a portion of the catalytic layer formed on the first surface region is lesser than at least a portion of the catalytic layer formed on the second surface region; and
a proton conduction unit in contact with the first surface region of the gas diffusion electrode.

2. The electrochemical device as claimed in claim 1, wherein the electrochemical device is a fuel cell.

3. The electrochemical device as claimed in claim 1, wherein the electrochemical device is an air cell.

4. The electrochemical device as claimed in claim 1, wherein the fibrous carbonaceous material contains at least a graphite material having a fibrous structure.

5. The electrochemical device as claimed in claim 4, wherein the fibrous carbonaceous material comprises a carbon material having a tubular structure.

6. The electrochemical device as claimed in claim 1, wherein the catalytic layer comprises a material selected from the group consisting of platinum, platinum alloys, palladium, magnesium, titanium, manganese, lanthanum, vanadium, zirconium, nickel, lanthanum alloys, titanium-iron alloys, iridium, rhodium, gold and combinations thereof.

7. An electrochemical device, comprising:
a gas diffusion electrode comprising a fibrous carbonaceous material and a catalytic layer formed on at least a portion of a surface of the fibrous carbonaceous material, a proton conducting unit contacting the gas diffusion electrode such that at least a portion of the fibrous carbonaceous material is embedded within the proton conduction unit, wherein at least a portion of the catalytic layer is formed on the embedded portion and at least a portion of the fibrous carbonaceous material that is not embedded within the proton conducting unit, wherein an amount of the catalytic layer is less in the embedded portion of the fibrous carbonaceous material than in the portion of the fibrous carbonaceous material that is not embedded within the proton conduction unit.

* * * * *